United States Patent [19]
Kanamine

[11] Patent Number: 5,894,389
[45] Date of Patent: Apr. 13, 1999

[54] THIN-FILM MAGNETIC HEAD HAVING A NARROW CORE WIDTH AND PROCESS FOR ITS PRODUCTION

[75] Inventor: Michiaki Kanamine, Kawasaki, Japan

[73] Assignee: Fujitsu Limited, Kawasaki, Japan

[21] Appl. No.: 08/957,092

[22] Filed: Oct. 24, 1997

[30] Foreign Application Priority Data

Apr. 30, 1997 [JP] Japan ................... 9-112635

[51] Int. Cl.$^6$ ................................. G11B 5/187
[52] U.S. Cl. .................. 360/126; 360/119; 29/603.16
[58] Field of Search ................... 360/113, 119–126; 29/603.07, 603.13, 603.15, 603.16

[56] References Cited

U.S. PATENT DOCUMENTS

| | | | |
|---|---|---|---|
| 4,151,574 | 4/1979 | Gerkema et al. | 360/113 |
| 4,799,118 | 1/1989 | Yamada et al. | 360/125 |
| 5,225,953 | 7/1993 | Wada et al. | 360/126 |
| 5,301,418 | 4/1994 | Dirne et al. | 360/120 |
| 5,666,249 | 9/1997 | Ohmori et al. | 360/123 |
| 5,691,866 | 11/1997 | Yamamoto | 360/126 |
| 5,734,534 | 3/1998 | Yamamoto et al. | 360/123 |

FOREIGN PATENT DOCUMENTS

| | | |
|---|---|---|
| 3181011 | 8/1991 | Japan. |
| 0689412 | 3/1994 | Japan. |
| 0684137 | 3/1994 | Japan. |

*Primary Examiner*—Jefferson Evans
*Attorney, Agent, or Firm*—Greer, Burns, & Crain, Ltd.

[57] ABSTRACT

A recess with a slanted wall is provided on a substrate, a magnetic yoke layer is formed so that the end of the magnetic yoke layer covers the slanted wall, and the recess is filled with a filling layer. Flat working is performed until a portion of the substrate is removed so that the magnetic yoke layer appears on the flat worked surface of the substrate, and the width of the magnetic yoke layer appearing on the top flat surface is almost determined by the thickness of the magnetic yoke layer, which defines the width of a core of a magnetic head. Thus, a narrow core width of a magnetic head is provided.

4 Claims, 5 Drawing Sheets

THIN-FILM MAGNETIC HEAD HAVING A NARROW CORE WIDTH AND PROCESS FOR ITS PRODUCTION

BACKGROUND OF THE INVENTION

1. Field of the Invention

The present invention relates to a thin-film magnetic head with a narrower core width than conventionally possible for improved track density in magnetic disk devices, and to a process for its production.

2. Description of the Related Art

A conventional magnetic transducer is illustrated in FIGS. 1 and 2A–2C. FIG. 1 is a perspective view of a magnetic head slider 31, on which a thin-film magnetic head element 33 is formed and exposed on the rail side (floating side) of the slider 31. FIGS. 2A–2C are enlarged views of the portion of the thin-film magnetic head 33 in which FIG. 2A is a plan view, FIG. 2B is a cross-sectional view of FIG. 2A cut along the line I—I and FIG. 2C is a cross-sectional view of FIG. 2A cut along the line II—II.

On a substrate 11 there are formed a first magnetic yoke layer 14, a gap layer 20, an interlayer dielectric layer 18, a coil layer 17, an interlayer dielectric layer 18 and a second yoke layer 19 laminated in that order, after which there are formed an external connecting terminal and a working protection film (not shown), and then the ends of the first and second magnetic yoke layers 14, 19 are subjected to cutting and working at the I—I portion to make a thin-film magnetic head.

The portion which is cut and worked at the end (I—I portion) corresponds to the side facing the surface 41 of the recording medium (represented by the imaginary line in FIG. 2C, and is called the floating side 42. The width of the magnetic core of the magnetic head is determined by the width W of the section of the combined first magnetic yoke layer 14 and second magnetic yoke layer 19 (although a gap exists between them) which are exposed at the floating side.

According to the conventional magnetic transducer production process described above, the first magnetic yoke layer 14 and the second magnetic yoke layer 19 are pattern formed by a selective plating method with a resist mask or an ion milling method with a resist mask, and the core width is established during these steps.

Improved track density of the magnetic disk device requires that the core width be narrow, but because of restrictions on the resolving power of the resist it has been very difficult to realize a core width of 1 μm or less, or narrower than the film thickness of the magnetic yoke layer (about 2–4 μm).

It is an object of the present invention to provide a novel process which allows formation of magnetic yoke layers with narrow core widths, free from the restriction of the resolving power of resist masks.

SUMMARY OF THE INVENTION

In order to achieve the object stated above, the present invention achieves a magnetic yoke layer of narrower core width by provision of a recess with a slanted wall on a substrate (or on an underlayer formed on the substrate), formation of the end of a first magnetic yoke layer so that it covers the slanted wall and formation of a film of a filling layer which fills the recess, followed by flat working, e.g., lapping, polishing, so that the end of the first magnetic layer is exposed on the flat worked surface of the substrate, such that the core width is determined almost by the film thickness of the film.

Thus, according to the present invention there is provided the following thin-film magnetic head and process for its production.

(1) A thin-film magnetic head comprising a magnetic transducer with a first magnetic yoke layer, a magnetic gap layer, an interlayer dielectric film, a coil layer, an interlayer dielectric film and a second magnetic yoke layer laminated in that order on a substrate or an underlayer formed on the substrate, characterized in that the substrate or the underlayer contains a recess deeper than the thickness of the first magnetic yoke layer, the first magnetic yoke layer is formed in the recess, the recess has a slanted wall which is slanted in the direction of the core width at an end of the first magnetic yoke layer, the end of the first magnetic yoke layer is formed over the slanted wall with the remaining portion thereof extending on the surface of the substrate or underlayer surface, said remaining portion of the first magnetic yoke layer forms a plane parallel to the plane of the bottom of the recess, the remainder of the recess is filled, the magnetic gap layer is formed on said substrate or underlayer and extends onto the edge of said first magnetic yoke layer formed on the slanted wall, and the second magnetic yoke layer is formed on said magnetic gap layer including an area above said edge of the first magnetic yoke layer, so that the core width of the first and second magnetic yoke layers is determined by the dimension of the first magnetic yoke layer roughly in the direction of the layer thickness.

Alternatively, (1) A thin-film magnetic head has a magnetic transducer. The magnetic transducer includes a substrate which may have an underlayer on a main surface of said substrate, said substrate having a recess with a slanted wall which is slanted in a direction of said main surface of said substrate;

a first magnetic yoke layer formed on said substrate or underlayer in said recess and extending over said slanted wall, said recess having a depth deeper than the thickness of said first magnetic yoke layer;

a filling material filling said recess and having a top surface contiguous to the main surface of said substrate or underlayer;

a magnetic gap layer formed on said substrate or underlayer and said filling material and having a top surface, preferably a planer top surface;

an interlayer dielectric film formed on a first area of said magnetic gap layer;

a coil layer a portion of which is formed within said interlayer dielectric film;

a second magnetic yoke layer formed on said dielectric film and extending onto a second area of said magnetic gap layer, said second area including an area above an end portion of said first yoke layer existing on said slanted wall, so that the core width of said first and second magnetic yoke layers is determined by the dimension of said first magnetic yoke layer roughly in the direction of the layer thickness.

(2) A process for producing a thin-film magnetic head having a magnetic transducer with a first magnetic yoke layer, a magnetic gap layer, a coil layer, an interlayer dielectric film and a second magnetic yoke layer laminated in that order on a substrate or an underlayer formed on the substrate, characterized by the steps of:

providing a recess (3) on a section, designated for forming the end of the first magnetic yoke layer (4), of the substrate or underlayer formed on the substrate (1), said recess having a slanted wall (2) which is slanted in the direction of the core width (w);

forming the first magnetic yoke layer (4) on the substrate or underlayer (1) containing the recess;

forming a filling layer (5) on the substrate or underlayer (1) containing the recess and on the first magnetic yoke layer (4);

flat working the substrate or underlayer (1), the first magnetic yoke layer (4) and the filling layer (5), to a portion of the slanted wall (2), to expose the thickness cross-section of the first magnetic yoke layer; and laminating thereover, in order the magnetic gap layer (10), interlayer dielectric layer (8), coil layer (7), interlayer dielectric layer (8) and second magnetic yoke layer (9);

so that the core width (Cw) of the first and second magnetic yoke layers is determined by the width of the cross-section exposed at the surface of the first magnetic yoke layer (4).

The core width is established by the film thickness of the first magnetic yoke layer, and since control of the film thickness is relatively easy, a narrow core width of under 2 μm, and even under 1 μm, can be easily achieved.

DESCRIPTION OF THE PREFERRED EMBODIMENTS

Figure 1:
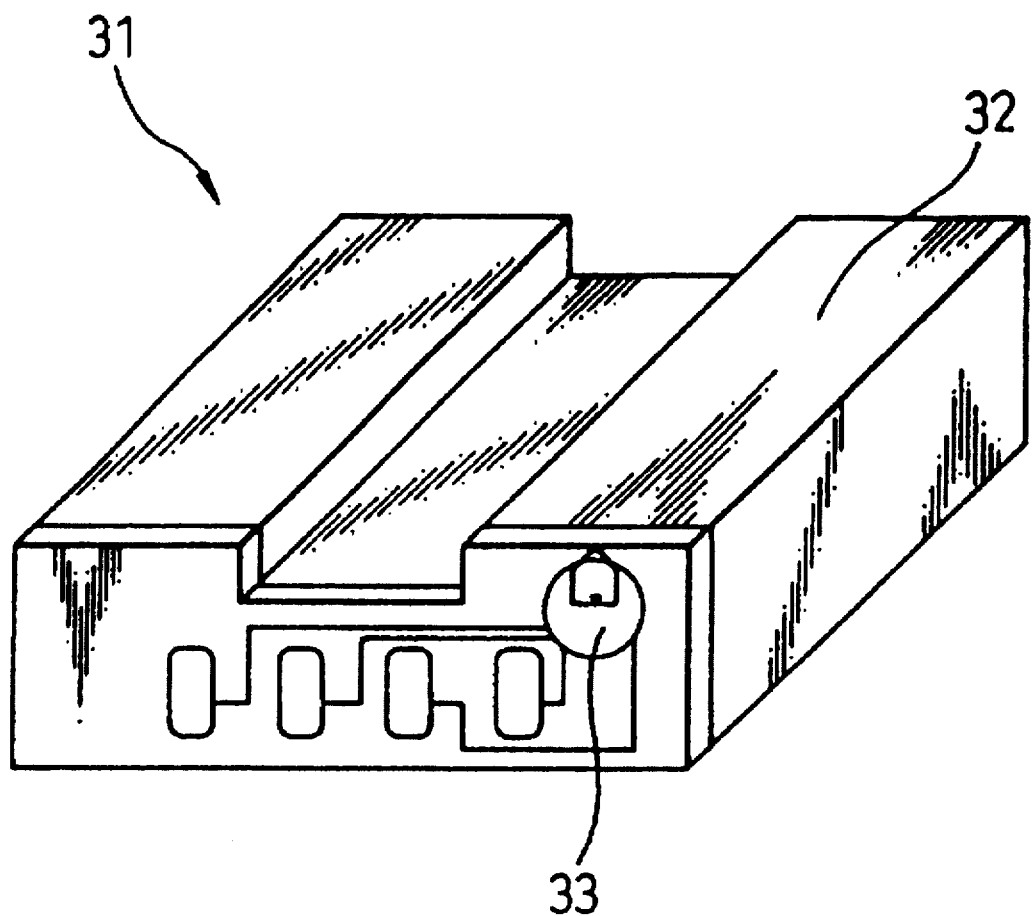
FIG. 1 is a perspective view of a slider on which is mounted a conventional thin-film magnetic head.
Figure 2A:
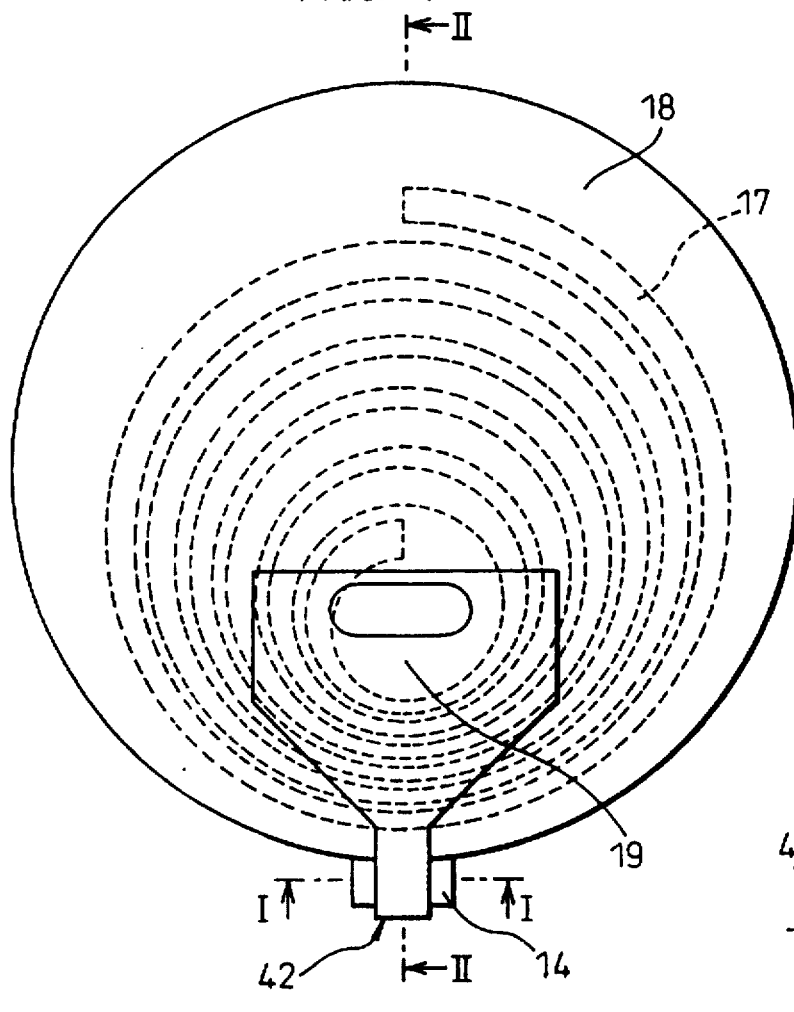
FIGS. 2A to 2C are illustrations of a conventional thin-film magnetic head.
Figure 2C:
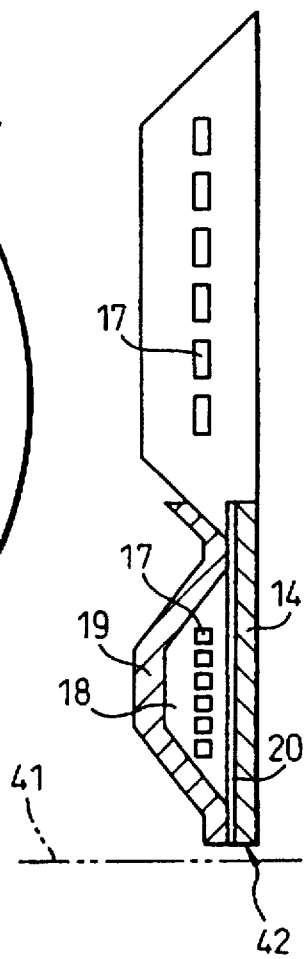
Figure 2B:
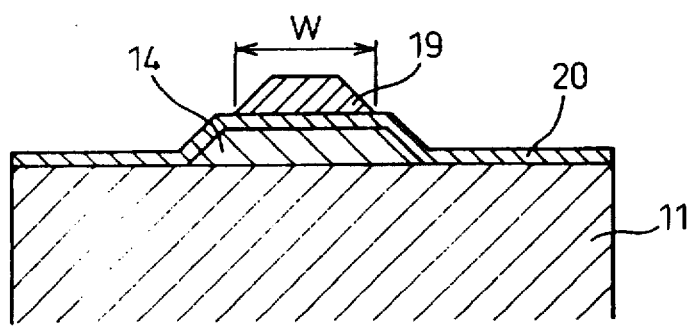
Figure 3A:
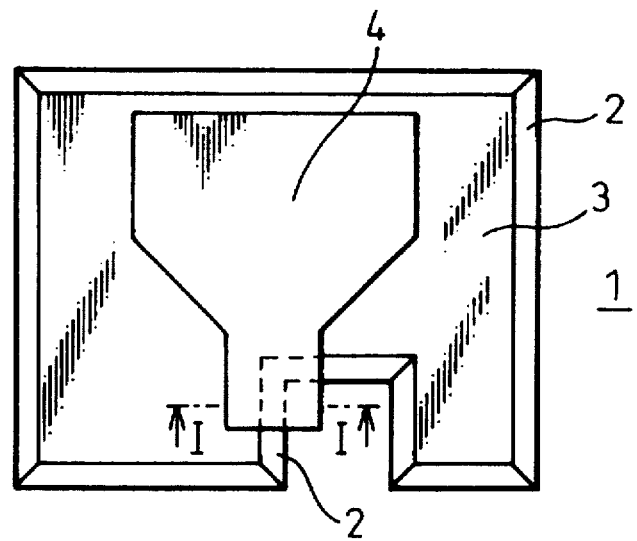
FIGS. 3A and 3B illustrate a step (before flat working) during production of the embodiment of the magnetic transducer.
Figure 4A:
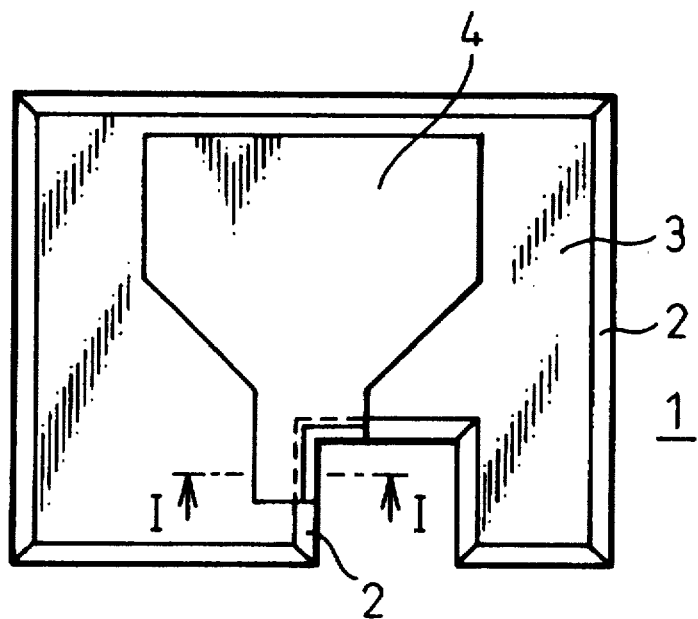
FIGS. 4A and 4B illustrate a step (after flat working) during production of the embodiment of the magnetic transducer.
Figure 4B:
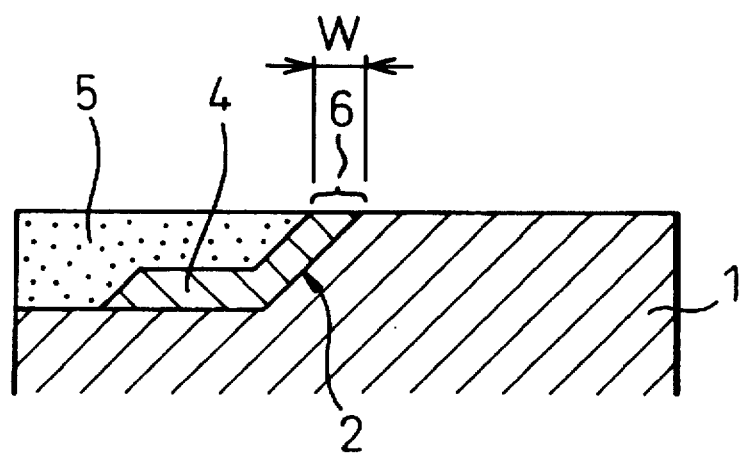
Figure 5A:
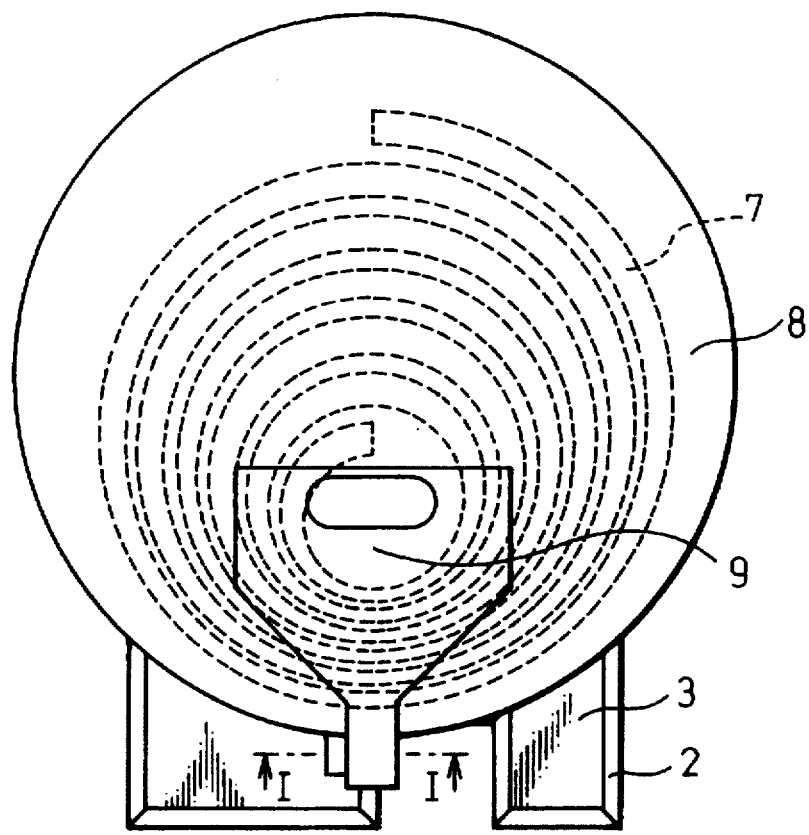
FIGS. 5A and 5B illustrate the embodiment of the magnetic transducer (after completion).
Figure 5B:
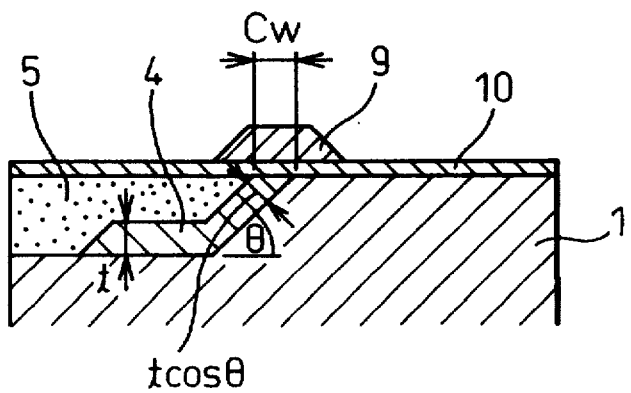

An embodiment of the present invention will now be explained with reference to the drawings. FIGS. 3A, 4A and 5A are plan views and FIGS. 3B, 4B and 5B are cross-sectional views cut along the line I—I in FIGS. 3A, 4A and 5A.

Figure 3B:
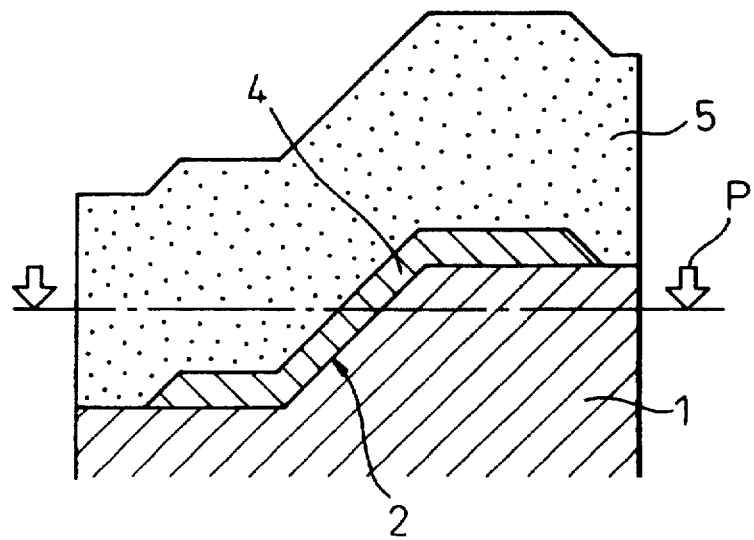

Referring to FIGS. 3A and 3B, a recess 3 with a slanted wall 2 slanted at about 45° is formed in a substrate of silicon or $Al_2O_3$.TiC (Altic). In this illustration, the interior enclosed by the frame of the slanted wall 2 is the recess 3. The shape of the recess 3 is such that the first magnetic yoke layer 4 can fit inside the recess 3, and so that the slanted edge of the recess 3 extends through the section designated for forming the end of the first magnetic yoke layer 4. The depth of the recess 3 is sufficiently greater than the film thickness of the formed first magnetic yoke layer so that the first magnetic yoke layer will not be damaged by the subsequent flat working. The film thickness of the first magnetic yoke layer is determined by considering the core width to be formed. Here, the depth of the recess is, for example, 3 μm in anticipation of the flat working.

A recess with a slanted wall can be formed in the substrate 1, for instance, by selection of the etching conditions. For formation of a recess with a slanted wall in a silicon substrate 1 for example, there is known a process of etching of the substrate side with a (100) surface using a KOH (potassium hydroxide) solution. A resist mask can be used to expose portions of the substrate side which can be subjected to KOH etching. The slanted wall formed in such a case is a (111) surface, and the slant angle is about 55°.

In addition, etching of Altic substrates can be performed in the same manner by reactive plasma etching. The type of gas used here is usually a fluorine-based gas. Control of the slanted wall angle is accomplished by the gas pressure, power, etc., and a slanted wall with an angle of about 45° can be obtained by appropriate selection of the conditions.

The pattern of the first magnetic yoke layer 4 is then formed within the recess, but the pattern extends so as to cover the slanted wall 2 of the recess 3 located at the end (section I—I) of the head. The material used for the first magnetic yoke layer 4 is a soft magnetic material such as NiFe (permalloy) or FeN, the film is formed by sputtering or plating, and the patterning is accomplished by the aforementioned selective plating method using a resist mask or by the ion milling method using a resist mask.

The filling layer 5 of $Al_2O_3$, etc. is then formed as a film over the entire surface of the substrate 1. The film forming method is not particularly restricted, and may be for example, sputtering. The material for the filling layer 5 is not particularly restricted so long as it is a non-magnetic layer which facilitates flat working. The filling layer 5 may be of a thickness which just completely fills the recess 3, but in practice flat working is facilitated by forming it to a thickness slightly higher than the top of the first magnetic yoke layer 4 on the substrate surface.

Referring to FIGS. 4A and 4B, the area of the first magnetic yoke layer 4 existing on the surface of the substrate 1 is completely removed by flat lapping P from the top of the filling layer 5 and further removing a portion of the substrate, so that a cross-section 6 in the direction of thickness of the first magnetic yoke layer 4 on the slanted wall 2 is exposed at the surface.

Referring to FIGS. 5A and 5B, a magnetic gap layer 10, interlayer dielectric layer 8, coil layer 7, interlayer dielectric layer 8 and second magnetic yoke layer 9 are then laminated in that order by common methods. The second magnetic yoke layer 9 is also patterned. The magnetic gap layer 10 may be made of a non-magnetic material such as $Al_2O_3$, $SiO_2$ or the like, and it is given a film thickness of, for example, 0.1–0.5 μm. The coil layer 7 is then formed to a thickness of, for example, 0.1–0.5 μm by selective plating of Cu or the like. The interlayer dielectric layer 8 is formed by, for example, hard baking of a resist (250° C.). The second magnetic yoke layer 9 is formed to a thickness of, for example, 1–5 μm by, for example, selective plating of NiFe or by sputtering or ion milling of FeN.

Here, the core width Cw in FIG. 5B showing a cross-section of FIG. 5A along I—I is determined by the width w of the first magnetic yoke layer 6 exposed at the surface in the direction of thickness, as shown in FIGS. 4A and 4B.

If t is defined as the thickness of the film formed on the plane of the first magnetic yoke layer 4 (substrate plane and recess base plane), then the film thickness of the first magnetic yoke layer 4 formed on the slanted wall with an angle of θ (normal to the slanted wall) is t cos θ, and therefore the width w in the direction of thickness of the first magnetic yoke layer 6 exposed at the surface by flat working (i.e. Cw) is calculated as t cos θ/sin θ. For example, with a slanted wall where θ is 45°, Cw=t and therefore the width w of the first magnetic yoke layer 6, i.e. the core width Cw of the yoke, is roughly equal to the film thickness t of the first magnetic yoke layer 4.

Since the film thickness of the first magnetic yoke layer can be adequately controlled to even 1 μm or less, the core width can also be controlled to 1 μm or less.

Consequently, it is possible to accomplish the formation of the core, while controlling the core width Cw as desired on a roughly equivalent order as the film thickness t of the first magnetic yoke layer 4, although it will depend on the angle of the slanted wall 2. The angle of the slanted wall is preferably in the range of 20–70°. Within this angle range, the core width Cw can be controlled as desired and formed to a narrow width.

When a current is passed through the coil, the first and second magnetic yoke layers are magnetized, generating a magnetic field on the medium surface near the gap layer at the end of the magnetic yoke layers. This accomplishes recording of recording information on the medium surface at a width corresponding to the core width. Since a narrower core width allows recording of more information on the medium surface, the recording density (strictly speaking, the track density, which is the number of tracks per inch of length, or TPI) is improved.

The embodiment described above has an inductor-type magnetic head formed directly on the substrate, but recently MR heads (magnetoresistant heads) have come into use, and since MR heads are for reading, some types have the MR element formed on the substrate with the inductor head formed thereover in the manner described above for writing. In these cases, after formation of the MR element a flattened underlayer is formed thereon of a non-magnetic and electrically resistant material, and the inductor head is formed thereover. The present invention also encompasses such types where the underlayer is formed on the substrate, the recess is formed in the underlayer and the magnetic yoke fills the recess.

According to the present invention it becomes possible to easily produce magnetic transducers with narrow core widths aid realize large-capacity magnetic disk devices with high track density, a goal which has been difficult to achieve by conventional production.

What is claimed is:

1. A thin-film magnetic head comprising a magnetic transducer, said magnetic transducer comprising a substrate which may have an underlayer on a main surface of said substrate, said substrate having a recess with a slanted wall which is slanted relative to a main surface of said substrate;

a first magnetic yoke layer formed on said substrate or underlayer in said recess and extending over said slanted wall, said recess having a depth deeper than the thickness of said first magnetic yoke layer;

a filling material filling said recess and having a top surface contiguous to the main surface of said substrate or underlayer;

a magnetic gap layer formed on said substrate or underlayer and said filling material and having a top surface;

an interlayer dielectric film formed on a first area of said magnetic gap layer;

a coil layer a portion of which is formed within said interlayer dielectric film;

a second magnetic yoke layer formed on said dielectric film and extending onto a second area of said magnetic gap layer, said second area including an area above an end portion of said first yoke layer existing on said slanted wall, so that the core width of said first and second magnetic yoke layers is determined by the dimension of said first magnetic yoke layer roughly in the direction of the layer thickness.

2. A thin-film magnetic head according to claim 1, wherein said core width is 1 µm or less.

3. A thin-film magnetic head according to claim 1, wherein said slanted wall has an angle of 20–70°.

4. A process for producing a thin-film magnetic head comprising a magnetic transducer with a first magnetic yoke layer, a magnetic gap layer, an interlayer dielectric film, a coil layer, an interlayer dielectric film and a second magnetic yoke layer laminated in that order on a substrate or an underlayer formed on the substrate, characterized by comprising the steps of;

providing a recess (3) on a section, designated for forming the end of the first magnetic yoke layer (4), of the substrate or underlayer formed on the substrate (1), said recess having a slanted wall (2) which is slanted in the direction of a core width (w) of said first magnetic yoke layer;

forming the first magnetic yoke layer (4) on said substrate or underlayer (1) containing said recess;

forming a filling layer (5) on the substrate or underlayer (1) containing said recess and on said first magnetic yoke layer (4);

evenly removing said substrate or underlayer (1), said first magnetic yoke layer (4) and said filling layer (5), to a portion of said slanted wall (2), to expose the thickness cross-section of said first magnetic yoke layer; and laminating thereover in order the magnetic gap layer (1), interlayer dielectric layer (8), coil layer (7), interlayer dielectric layer (8) and second magnetic yoke layer (9);

so that the core width (Cw) of said first and second magnetic yoke layers is determined by the width of said cross-section exposed at said surface of said first magnetic yoke layer (4).

* * * * *